(12) United States Patent
Endres

(10) Patent No.: US 10,843,446 B2
(45) Date of Patent: Nov. 24, 2020

(54) UNBROKEN LOOP POLYMER FILM AND METHODS OF MAKING THE SAME

(71) Applicant: Terry L. Endres, Fort Collins, CO (US)

(72) Inventor: Terry L. Endres, Fort Collins, CO (US)

(*) Notice: Subject to any disclaimer, the term of this patent is extended or adjusted under 35 U.S.C. 154(b) by 0 days.

(21) Appl. No.: 16/128,942

(22) Filed: Sep. 12, 2018

(65) Prior Publication Data
US 2019/0184691 A1 Jun. 20, 2019

Related U.S. Application Data

(60) Provisional application No. 62/707,748, filed on Dec. 18, 2017.

(51) Int. Cl.
*B32B 27/32* (2006.01)
*B32B 27/08* (2006.01)
(Continued)

(52) U.S. Cl.
CPC ........ *B32B 27/327* (2013.01); *A44B 18/0011* (2013.01); *B32B 27/08* (2013.01);
(Continued)

(58) Field of Classification Search
CPC ..... B32B 3/06; B32B 3/30; B32B 5/022–026; B32B 5/04–06; B32B 7/035; B32B 7/06; B32B 27/08; B32B 27/12; B32B 27/32; B32B 27/327; B32B 2250/03; B32B 2250/242; B32B 2255/02;
(Continued)

(56) References Cited

U.S. PATENT DOCUMENTS

| | | | | |
|---|---|---|---|---|
| 4,643,176 A | * | 2/1987 | Mason | A61F 5/0123 602/16 |
| 4,709,562 A | * | 12/1987 | Matsuda | A44B 18/0034 24/445 |

(Continued)

OTHER PUBLICATIONS

Roy, P. K., Tanveer Malik, and T. K. Sinha. "Thermal Bonded Nonwoven—An Overview." Technical Textile.net. Technical Textile. net, Jan. 25, 2011. Web. <https://technicaltextile.net/articles/thermal-bonded-nonwoven-an-overview-5402>. (Year: 2011).*

(Continued)

*Primary Examiner* — Laura C Powers
*Assistant Examiner* — Larissa Rowe Emrich
(74) *Attorney, Agent, or Firm* — Jonathan M. Hartley; Ryan L. Marshall

(57) ABSTRACT

A polymer composite is disclosed and a method of making the same. The polymer composite includes an unbroken loop fabric having first second sides and a polymer film. The polymer film has first and second sides, the first side of the polymer film being bonded to the second side of the unbroken loop fabric. The polymer film is a polymer selected from polyethylene, polypropylene, or any combination thereof. The polymer composite may also include a polymer sheet with first and second sides. The first side of the polymer sheet is bonded to the second side of the polymer film. The polymer sheet may include a polymer selected from polyethylene, polypropylene, or any combination thereof.

13 Claims, 2 Drawing Sheets

(51) Int. Cl.
*C08L 23/06* (2006.01)
*D04B 1/02* (2006.01)
*A44B 18/00* (2006.01)
*D03D 27/00* (2006.01)
*D04B 21/02* (2006.01)

(52) U.S. Cl.
CPC .............. *C08L 23/06* (2013.01); *D03D 27/00* (2013.01); *D04B 1/02* (2013.01); *D04B 21/02* (2013.01); *B32B 2323/043* (2013.01); *C08L 2203/16* (2013.01); *C08L 2205/025* (2013.01)

(58) Field of Classification Search
CPC ...... B32B 2255/26–28; B32B 2307/51; B32B 2309/02; B32B 2309/04; B32B 2323/04–043; B32B 2323/10; B29L 2031/729; C08L 23/06; C08L 2203/16; C08L 2205/025; A44B 18/0011; A44B 18/0034; A44B 18/0057; A61F 13/62; D03D 27/00–18; D04B 1/02–04; D04B 21/02; Y10T 428/23914–23993; Y10T 428/24008; Y10T 428/24025; Y10T 428/24355; Y10T 428/249923; Y10T 442/2025; Y10T 442/2369–2377; Y10T 442/3854; Y10T 442/3886
USPC ......... 24/442–452; 428/85–97, 99, 101, 141, 428/223; 442/62, 104–105, 286, 290
See application file for complete search history.

(56) References Cited

U.S. PATENT DOCUMENTS

| | | | |
|---|---|---|---|
| 4,761,318 A * | 8/1988 | Ott | A44B 18/0011 156/244.11 |
| 5,036,838 A | 8/1991 | Sherman | |
| 5,609,570 A | 3/1997 | Lamont | |
| 5,626,556 A | 5/1997 | Tobler et al. | |
| 6,845,639 B1 * | 1/2005 | Hajek | A44B 18/0034 66/195 |
| 7,048,818 B2 * | 5/2006 | Krantz | A44B 18/0049 156/244.25 |
| 7,942,837 B2 | 5/2011 | Clark et al. | |
| 8,951,217 B2 | 2/2015 | Joseph | |
| 2003/0232170 A1 * | 12/2003 | Gillette | A44B 18/0011 428/92 |
| 2008/0072629 A1 * | 3/2008 | Gehring | D04B 21/18 66/202 |
| 2010/0196641 A1 * | 8/2010 | De Vos | C08L 23/06 428/36.5 |
| 2012/0101417 A1 * | 4/2012 | Joseph | A61F 5/058 602/5 |

OTHER PUBLICATIONS

Fung, Walter. (2002). Coated and Laminated Textiles—Front Matter. Woodhead Publishing. Retrieved from https://app.knovel.com/hotlink/pdf/id:kt003HYY31/coated-laminated-textiles/front-matter (Year: 2002).*

Chiu, D. S., A. N. Gent, and J. R. White. "Tear Strength of Polyethylene." Journal of Materials Science 19 (1984): 2622-632. Print. https://rd.springer.com/content/pdf/10.1007%2FBF00550818.pdf (Year: 1984).*

Hinsley, Nana. "Density of Polyethylene." Density of Polyethylene. Global Plastic Sheeting, Feb. 20, 2012. Web. <https://www.globalplasticsheeting.com/our-blog-resource-library/bid/72325/Density-of-Polyethylene>. (Year: 2012).*

Mills, N. M.. Polyolefin Foams. United Kingdom, Rapra Technology Limited, 2003. (Year: 2003).*

Ashby, Michael F., and Y.J.M. Brechet. "Designing Hybrid Materials." Acta Materialia, vol. 51, No. 19, Nov. 2003, pp. 5801-5821., doi:10.1016/S1359-6454(03)00441-5. (Year: 2003).*

* cited by examiner

UNBROKEN LOOP POLYMER FILM AND METHODS OF MAKING THE SAME

CROSS-REFERENCE TO RELATED APPLICATIONS

This application is a non-provisional application which claims priority to U.S. provisional application Ser. No. 62/707,748, filed Dec. 18, 2017, which is incorporated by reference herein in its entirety.

BACKGROUND

1. Field of the Invention

The present disclosure generally relates to polymer composites. More particularly, the disclosure pertains to an unbroken loop film for attaching to a polymer sheet.

2. Description of the Related Art

Injury or illness may necessitate the immobilization or other support of one or more limbs of an individual to enable movement such as walking or running. Support for the movement of the human body can be provided by a medical device.

The orthotic and prosthetic industry designs and manufactures supportive devices such as, for example, braces, artificial limbs, and other medical or surgical devices. These devices are commonly made of polymers that can be manufactured, molded, and custom fit for the patient.

BRIEF SUMMARY

A polymer composite is disclosed. The polymer composition may include an unbroken loop fabric having a first side and a second side; a polymer film having a first side of the polymer film and a second side of the polymer film. The first side of the polymer film may be bonded to the second side of the unbroken loop fabric. The polymer film may be a polymer selected from polyethylene, polypropylene, and any combination thereof. The polymer film may have a thickness of less than about 0.1 inches. The polymer composite may include a polymer sheet having a first side of the polymer sheet and a second side of the polymer sheet. The first side of the polymer sheet may be bonded to the second side of the polymer film. The polymer sheet may be a polymer selected from polyethylene, polypropylene, and any combination thereof. The polymer sheet may have a thickness of about 0.03 inches to about 4 inches.

A method of making a polymer composite is disclosed. The method may include coating a portion of an unbroken loop fabric with a polymer film to form an unbroken loop film. The polymer film may be a polymer selected from polyethylene, polypropylene, and any combination thereof. The method may include attaching the unbroken loop film to a polymer sheet. The polymer sheet may be a polymer selected from polyethylene, polypropylene, and any combination thereof.

A method of making a polymer composite is disclosed that may include attaching an unbroken loop film to a polymer sheet. The unbroken loop film may include an unbroken loop fabric bonded to a polymer film. The polymer film may be a polymer selected from polyethylene, polypropylene, and any combination thereof. The polymer sheet may be a polymer selected from polyethylene, polypropylene, and any combination thereof.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Various embodiments are described below. The relationship and functioning of the various elements of the embodiments may better be understood by reference to the following detailed description. The embodiments, however, are not limited to those illustrated below. In certain instances details may have been omitted that are not necessary for an understanding of embodiments disclosed herein.

Figure 1:
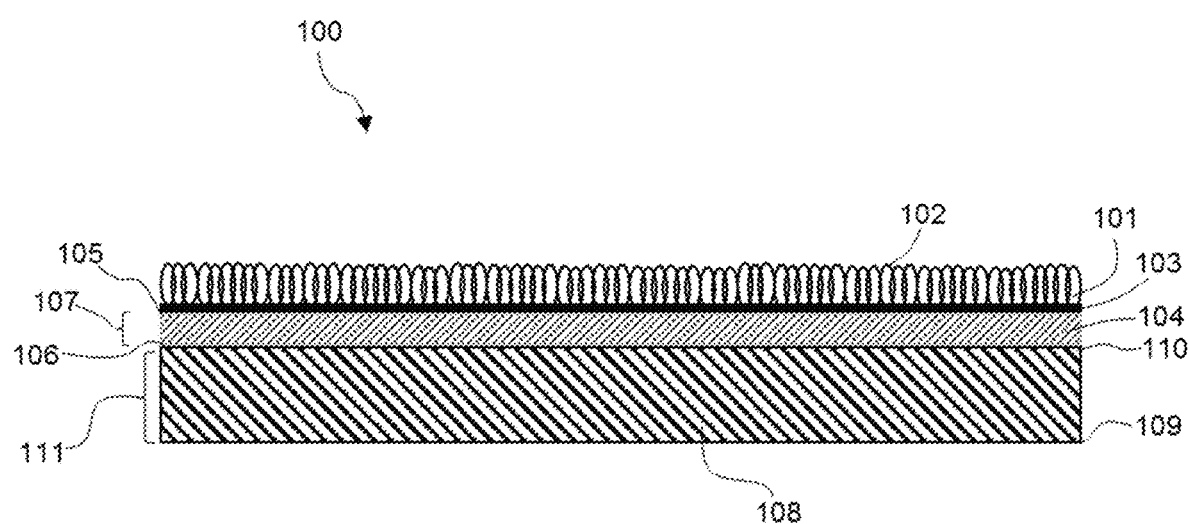
FIG. 1 shows a cross section of a polymer composite material.

Referring to FIG. 1, a cross-section of the polymer composite 100 is depicted. The polymer composite 100 may include an unbroken loop fabric 101 having a first side 102 and a second side 103. A polymer film 104 having a first side 105 of the polymer film 104 and a second side 106 of the polymer film 104, the first side 105 of the polymer film being bonded to the second side 103 of the unbroken loop fabric 101. The polymer film 104 may include a polymer selected from polyethylene, polypropylene, or any combination thereof. The polymer film 104 may have a thickness 107 of less than about 0.1 inches. The polymer composite 100 may also include a polymer sheet 108 having a first side 109 of the polymer sheet 108 and a second side 110 of the polymer sheet 108. The first side 109 of the polymer sheet 108 being bonded to the second side 106 of the polymer film 104. The polymer sheet 108 may include a polymer selected from polyethylene, polypropylene, or any combination thereof. The polymer sheet 108 may have a thickness 111 of about 0.03 inches to about 4 inches.

The unbroken loop fabric may be made of any known material used to manufacture such fabrics. The fabric may be made of nylon, polyester, or other polymers. Preferably, the unbroken loop fabric is made of nylon. The nylon may be denier nylon. Fabric containing nylon cleans easily with mild soap and water. The fabric can be made by any known method to one of skill in the art such as weaving, knitting, tufting, or stitchthrough.

The unbroken loop fabric has about equal stretch in weft and warp directions. The unbroken loop fabric has a 4-way stretch meaning it will stretch both on and across the grain. The stretch of the fabric may be from about 5% to about 90%. The stretch in the weft direction of the unbroken loop fabric may be 10%, 20%, 30%, 40%, 50%, 60%, 70% or 80%. The stretch in the warp direction of the unbroken loop fabric may be 10%, 20%, 30%, 40%, 50%, 60%, 70%, or 80%.

The unbroken loop fabric can be fastened to and released from an appropriate hook-type material. Any hook-type material can be used that provides the desired attachment to the loop fabric.

The polymer film may include polyethylene, polypropylene, or a mixture of polyethylene and polypropylene. In some embodiments, the polymer film is polypropylene. In some embodiments, the polymer film is polyethylene. In some embodiments, the polymer film is a blend of polyethylene and polypropylene.

The polymer film may have a density of about 0.90 g/cm$^3$ to about 0.93 g/cm$^3$. In some embodiments, the density of the polymer film is about 0.91 g/cm$^3$.

The polymer film may include other additives such as, for example, dyes, lubricants, plasticizers, antistatic additives, flame retardants, antiblock additives, no-slip additives, and the like. In some embodiments, the polymer film may also include metallocene.

The amount of metallocene in the polymer film may range from about 10 weight percent to about 50 weight percent. In some embodiments, the amount of metallocene in the polymer film may be about 20, about 30, or about 40 percent by weight.

The polymer film may be attached to or coated onto the unbroken loop fabric by any known means. The polymer film may be thermally bonded to the unbroken loop fabric.

In some embodiments, the polymer film does not include foam. In such an embodiment, the unbroken loop fabric is not bonded to a foam such as a thermoplastic foam.

The polymer sheet may include polyethylene, polypropylene, or a mixture of polyethylene and polypropylene. In some embodiments, the polymer sheet is polyethylene. In some embodiments, the polymer sheet is polypropylene. The polymer sheet may be made of high density polyethylene. The polymer sheet may have a density of about 0.94 g/cm$^3$ to about 0.965 g/cm$^3$.

The polymer sheet may be thermally bonded to the polymer film. In some embodiments, there is no adhesive applied onto the surface of the polymer film or the surface of the polymer sheet.

The use of the polymer composite is not limited to the orthotic and prosthetic industry. The material can be used to modify any product where having a loop fabric on the surface of the product would be beneficial.

An orthotic or prosthetic may be made of the polymer composite. A brace made of the polymer composite can be receptive to hook-type materials over the entire surface of the brace. In some embodiments, the entire outer surface of the orthotic or prosthetic is covered with the unbroken loop fabric that is bonded to a polymer film and where the polymer film is bonded to a polymer sheet. In some embodiments having a loop fabric over the entire surface of the device enables more versatile adjustment which leads to a more comfortable fit.

Figure 2:
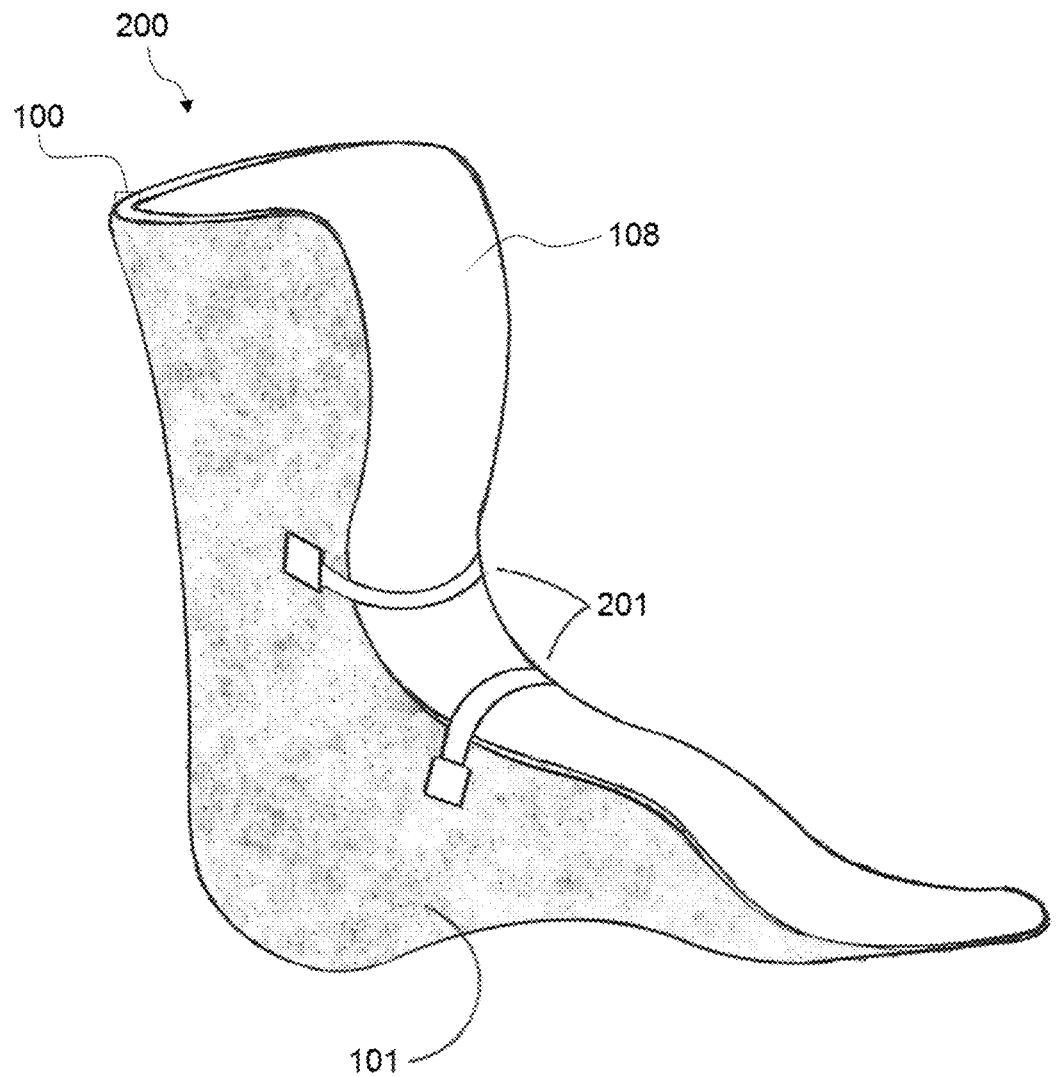
FIG. 2 shows an embodiment of a foot brace.

FIG. 2 shows an embodiment of a foot brace 200 that is made of the polymer composite 100. The surface of the brace is covered with an unbroken loop fabric 101 and the inside surface of the brace is a polymer sheet 108. Fastening straps with a hook tab 201 can be placed at any location on the outside of the brace 200. The hook tab attaches to the unbroken loop fabric 101. The number of fastening straps with a hook tab 201 is not limited to the number depicted in FIG. 2.

A method of making the polymer composite is disclosed. The method may include coating a portion of an unbroken loop fabric with a polymer film to form an unbroken loop film. The unbroken loop film includes the unbroken loop fabric bonded to the polymer film. The polymer film may include a polymer selected from polyethylene, polypropylene, or any combination thereof. The method may include attaching the unbroken loop film to a polymer sheet. The polymer sheet may include a polymer selected from polyethylene, polypropylene, or any combination thereof.

In some embodiments, the polymer film can be formed on the unbroken loop fabric by coating a side of the unbroken loop fabric with a liquid resin.

In some embodiments, the unbroken loop fabric can be laminated to the polymer film at a temperature of about 200° F. to about 350° F. In some embodiments, the temperature may be about 250° F. to about 350° F. When the unbroken loop fabric and the polymer film are laminated together at a temperature of about 200° F. to about 350° F. for a dwell time of about 10 to about 50 seconds. In some embodiments, the dwell time may be about 20, 30, or 40 seconds.

In some embodiments, a method of making a polymer composite is disclosed. The method can include attaching an unbroken loop film to a polymer sheet. The unbroken loop film can include an unbroken loop fabric bonded to a polymer film. The polymer film having a polymer selected from polyethylene, polypropylene, or any combination thereof. The polymer sheet can include a polymer selected from polyethylene, polypropylene, or any combination thereof.

EXAMPLES

A nylon unbroken loop fabric was selected that had an average stretch in the length direction of about 70% and an average stretch in the width direction of about 55%. The unbroken loop fabric was heat bonded to a polypropylene film to form an unbroken loop film. The unbroken loop film was then bonded to a heated sheet of polypropylene. The unbroken loop film was successfully attached to the polypropylene sheet without damaging the fabric.

As used herein, the term "about" refers to the cited value being within the errors arising from the standard deviation found in their respective testing measurements, and if those errors cannot be determined, then "about" refers to within 10% of the cited value.

All of the materials and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of making a polymer composite, comprising:
    laminating a portion of a woven unbroken loop fabric to a polymer film to form a unbroken loop film, the polymer film comprising polyethylene or polypropylene, wherein the unbroken loop fabric comprises about 20% to about 90% of stretch in a warp direction and about 20% to about 90% stretch in a weft direction,
    attaching the unbroken loop film to a polymer sheet, the polymer sheet comprising a polymer selected from polyethylene, polypropylene, and any combination thereof; and
    forming the polymer sheet into a prosthetic or a brace after attaching the unbroken loop film the outer surface of the prosthetic or brace,
    wherein the polymer sheet has a density of about 0.94 g/cm$^3$ to about 0.97 g/cm$^3$.

2. The method of claim 1, wherein the unbroken loop fabric is laminated to the polymer film at a temperature of about 200° F. to about 350° F.

3. The method of claim 1, wherein the unbroken loop fabric has about equal stretch in weft and warp directions.

4. The method of claim 1, wherein the polymer film comprises polyethylene.

5. The method of claim 1, wherein the unbroken loop fabric comprises nylon.

6. The method of claim 1, wherein the polymer film is thermally bonded to the unbroken loop fabric.

7. The method of claim 1, wherein the unbroken loop fabric having a first side and a second side, and the polymer film having a first side of the polymer film and a second side of the polymer film, the first side of the polymer film being bonded to the second side of the unbroken loop fabric.

8. The method of claim 1, wherein the polymer film has a thickness of less than about 0.1 inches.

9. The method of claim 1, wherein the unbroken loop fabric is not bonded to a foam.

10. The method of claim 1, wherein there is no adhesive applied onto a surface of the polymer film.

11. The method of claim 1, wherein the unbroken loop fabric and the polymer film are laminated together at a temperature of about 200° F. to about 350° F. for a dwell time of about 10 to about 50 seconds.

12. The method of claim 1, wherein the unbroken loop fabric comprises 80% to about 90% of stretch in a warp direction and about 20% to 60% stretch in a weft direction.

13. A method of making a polymer composite, comprising:
    laminating a portion of a woven or knitted unbroken loop fabric to a polymer sheet, the polymer sheet comprising a polymer selected from polyethylene, polypropylene, and any combination thereof;
    attaching the unbroken loop film to a polymer sheet, the polymer sheet comprising a polymer selected from polyethylene, polypropylene, and any combination thereof; and
    forming the polymer sheet into a prosthetic or a brace after attaching the unbroken loop film to the outer surface of the prosthetic or brace, wherein the unbroken loop fabric comprises about 20% to about 90% of stretch in a warp direction and about 20% to about 90% stretch in a weft direction, wherein the polymer sheet has a density of about 0.94 g/cm$^3$ to about 0.97 g/cm$^3$.

* * * * *